United States Patent [19]

Rodriguez

[11] Patent Number: 4,610,393
[45] Date of Patent: Sep. 9, 1986

[54] COLD AND HOT WATER MIXER TAP WITH CERAMIC PLATES CONTROLLED BY MEANS OF A THERMOSTAT

[75] Inventor: Jean-Jacques Rodriguez, Douvaine, France

[73] Assignee: Kugler, Fonderie et Robinetterie S.A., Geneva, Switzerland

[21] Appl. No.: 698,439

[22] Filed: Feb. 5, 1985

[30] Foreign Application Priority Data

Mar. 16, 1984 [CH] Switzerland .................... 1347/84

[51] Int. Cl.[4] ............................................. G05D 23/13
[52] U.S. Cl. ................................. 236/12.15; 137/607; 236/12.18
[58] Field of Search ............... 236/12.15, 12.16, 12.18, 236/12.2, 12.14; 137/607, 636.2, 636.3

[56] References Cited

U.S. PATENT DOCUMENTS

| | | | |
|---|---|---|---|
| 2,267,976 | 12/1941 | Hermann | 236/12.18 |
| 3,678,961 | 7/1972 | Grosche | 137/636.2 |
| 3,987,819 | 10/1976 | Scheuermann | 137/636.2 X |
| 4,122,726 | 10/1978 | Tolnai | 137/636.2 X |
| 4,325,403 | 4/1982 | Uhlmann | 137/636.2 X |

FOREIGN PATENT DOCUMENTS

| | | |
|---|---|---|
| 0060481 | 9/1982 | European Pat. Off. . |
| 2804755 | 8/1979 | Fed. Rep. of Germany . |
| 2928330 | 1/1981 | Fed. Rep. of Germany . |
| 2117179 | 7/1972 | France . |
| 2240395 | 3/1975 | France . |
| 2356068 | 1/1978 | France . |
| 2483036 | 11/1981 | France . |
| 2052019 | 1/1981 | United Kingdom . |

*Primary Examiner*—William E. Tapolcai
*Attorney, Agent, or Firm*—Young & Thompson

[57] ABSTRACT

A body (1) presenting inlet openings (2,3) for cold water and hot water and an outlet opening (4) for the mixed water, has a device for regulating the flowrate of at least one of the incoming streams of water and of the mixture of water (12, 13, 14, 15, 16, 23, 24) and a device for regulating the temperature (43 to 51) actuated by control members (13, 49). The device for regulating the flow rate (12 to 16, 23, 24) comprises as obturator only one pair of ceramic plates (23, 24) displaceable in rotation the one with respect to the other, the flow rate of and contacting simultaneously only one stream of inlet water and the stream of the outgoing water mixture.

14 Claims, 8 Drawing Figures

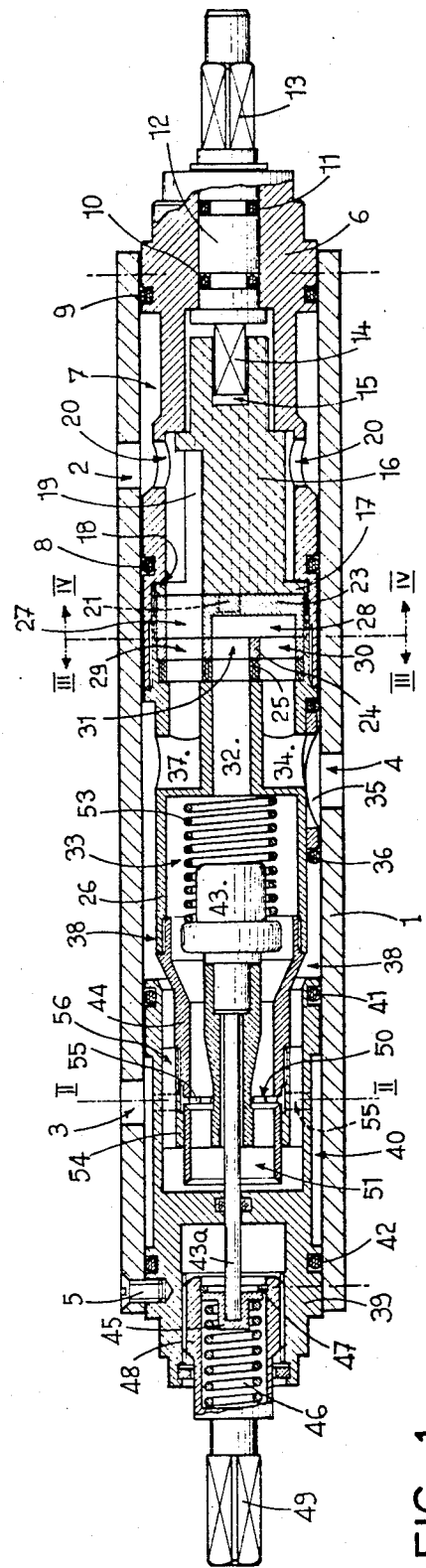
FIG. 1
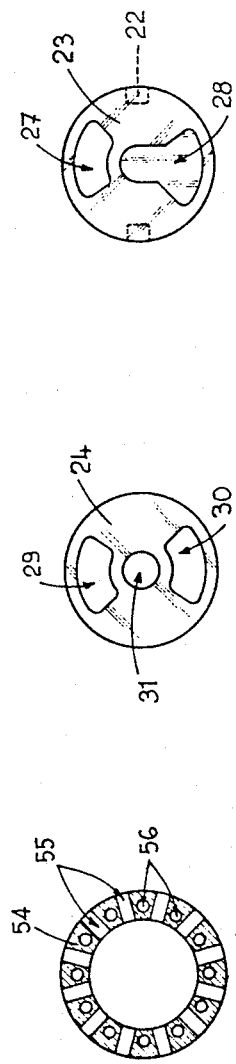
FIG. 3
FIG. 4
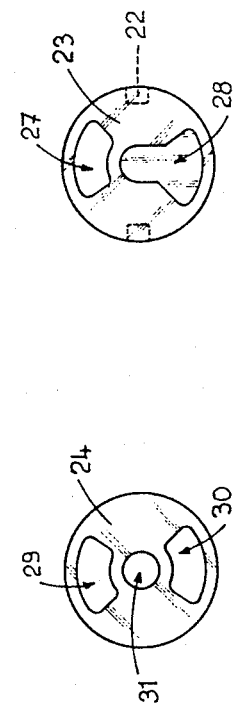
FIG. 2

COLD AND HOT WATER MIXER TAP WITH CERAMIC PLATES CONTROLLED BY MEANS OF A THERMOSTAT

The present invention has for its object a cold and hot water mixer tap with ceramic plates which is controlled by a thermostat of the type comprising a tubular body presenting a manual control member of the water flow and a manual control member of the desired temperature of the water mixture.

Such a mixer tap is for example known from the published German patent application DE-OS 2,928,330. This mixer tap has the drawback of requiring to three plates for the control of the flow as well as for the closure of the waters.

A mixer tap of this type is also known from the published French patent application FR No. 81 09721. This mixer tap comprises of course a regulating member of the mixed water flow but it necessitates two pairs of ceramic plates, the one controlling the access of the cold water and the other the flow of the mixed water. The same manual control member of the flow has to control two pairs of plates, this leads to a complicated and onerous construction.

The present invention has for its object a cold and hot water mixer tap of the precited type tending to obviate to the drawbacks of the known mixer taps. It has particularly the aim to realize a mixer tap using only one pair of ceramic plates controlled in rotation by a manual control member permitting simultaneously effecting the flow control of the mixed water and avoiding an internal circulation of hot and cold water in the closed position of the mixer tap.

The attached drawings show schematically and by way of example two embodiments of the mixer tap according to the invention.

FIG. 1 is an axial cross section of a first embodiment of the mixer tap.

FIG. 2 is a cross section along line II—II of FIG. 1.

FIG. 3 is a cross section along a line III—III of FIG. 1.

FIG. 4 is a cross section along line IV—IV of FIG. 1.

Figure 5:
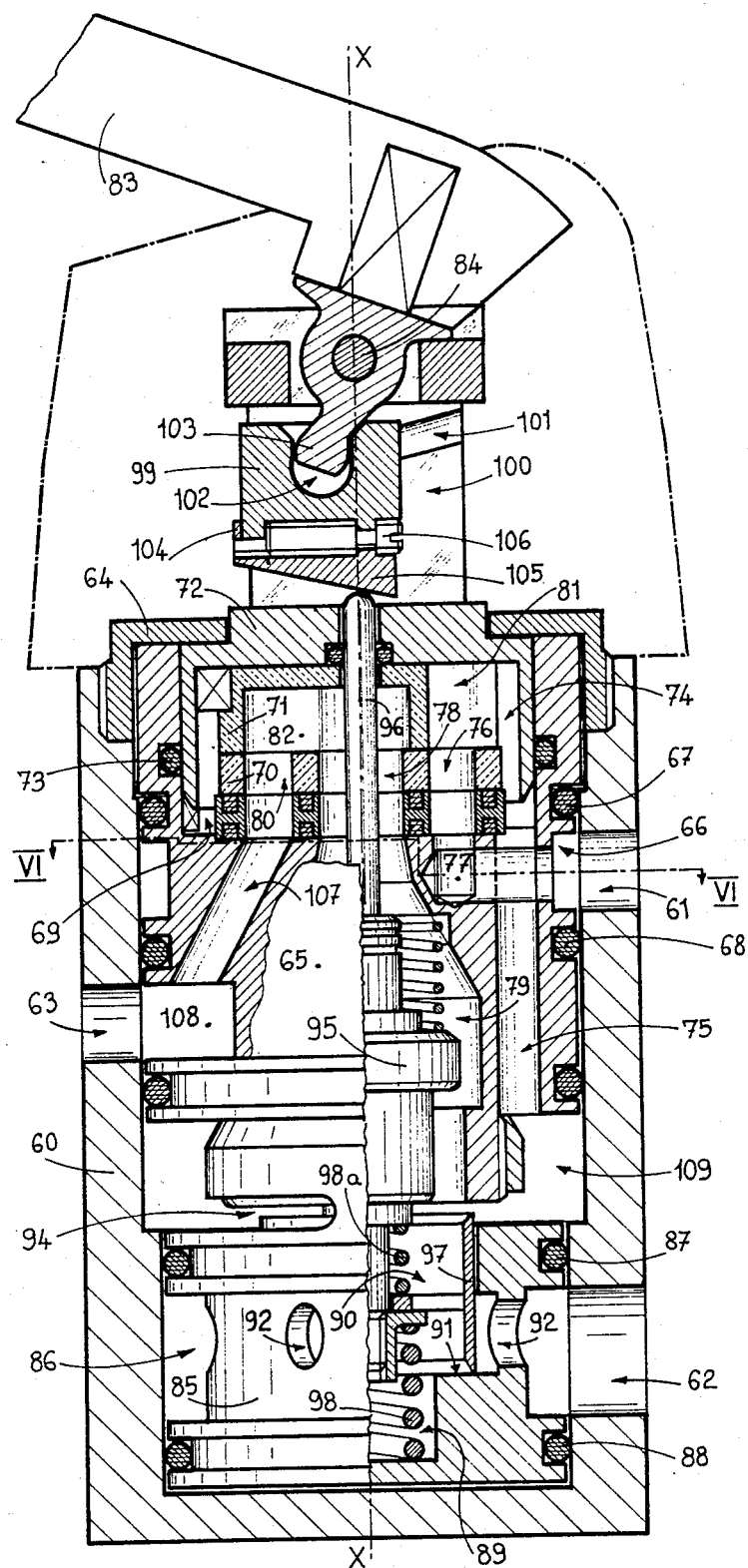
FIG. 5 is an axial cross section along line V—V of FIG. 6 of a second embodiment of the mixer tap.

The first embodiment of the mixer tap shown in FIGS. 1 to 4 comprises a tubular body presenting at one of its ends a manual control member of the flow of water and at its other extremity a manual regulating member of the desired temperature of the water mixture.

The tubular body 1 comprises an inlet opening for cold water 2, an inlet opening for hot water 3 and an outlet opening of the mixed water 4.

Within the tubular body 1 there is mounted a mechanism fixed to this body 1 by means of screws 5, comprising a control device of the flow of the water as well as a regulating device of the temperature of the mixed water.

The control device of the flow of the water located in the right part of the tubular body 1, comprises a body 6 having a general cylindrical shape the peripheral surface of which presents a diameter corresponding to the internal diameter of the tubular body 1. A groove 7 determines an annular chamber, made tight by ring joints 8, 9, which communicates with inlet opening 2 for the cold water. The end of this body 6 emerging from the tubular body 1, is axially traversed in a tight manner thanks to the joints 10, 11, by a control shaft 12, the outside end of which has a square 13 intended to receive a control member which is not shown. The internal end of this control shaft 12 has a driving square 14 meshing with a corresponding female formation 15 of a rotative driving member 16 having at its other end a portion having the shape of a disc 17 abutting against a shoulder 18 of the body 6 and the outside diameter of which corresponds to the inside diameter of a housing. The central part of this driving member 16 has an outside diameter smaller than the internal diameter of the body 1, as well as a milled groove 19. The body 6 presents holes 20 connecting the groove 7 to the said milled groove 19.

The frontal disc-shaped face of the driving member 16 comprises two extensions 21, disposed in two corresponding recesses 22 provided in a movable ceramic plate 23. A fixed ceramic plate 24 is applied against the movable plate 23 through a joint 25 and a connecting part 26 screwed in the end of the body 6.

The movable ceramic plate 23 is thus angularly fast with the driving member 16 and comprises a first opening 27 having the shape of a sector of ring disposed in front of the milled groove 19 and therefore in communication with the inlet 2 of cold water through the holes 20 and the groove 7. This movable plate comprises a recess 28 comprising an enlarged peripheral portion and a central portion surrounding the center of this plate.

The fixed plate 24 comprises two apertures having the shape of ring sectors 29, 30 diametrically opposed the one to the other as well as a central circular opening 31.

The connecting piece 26 comprises a central channel 32 communicating with this central opening 31 of the fixed plate and merging into a chamber 33. This connecting piece 26 comprises further a channel 34 connected with the opening 30 of the fixed plate 24 and ending in a chamber 35 of the tubular body 1, communicating with the outlet opening 4 of the mixed water. This chamber 35 is sealed by means of a ring joint 36 clamped between the tubular body 1 and the connecting part 26. This connecting part comprises finally a channel 37 in communication with the opening 29 of the fixed plate 24 and ending in a chamber 38 located between this connecting part 26 and the tubular body 1.

The device for regulating the desired temperature of the water mixture, located in the left part of the tubular body 1, comprises a cylindrical body 39 presenting an annular groove defining a chamber 40 in communication with the inlet opening 3 for hot water and sealed by means of ring joints 41, 42. This device comprises further a thermostatic bulb 43 surrounded by a sleeve 44, the frontal part of which is screwed on the linkage part 26, the bulb being partially housed in the chamber 33. This bulb is fast with an axial rod 43a, traversing in a sealed manner the end of the body 39, cooperating with a pusher 45 maintained by means of a spring 46 against an abutment 47, fast with a regulating member 48 screwed in the body 39, comprising a square 49 intended to receive a handle (not shown) permitting the regulation of the temperature of the water mixture.

The sleeve 44 screwed into the connecting part 26 has a free edge 50 constituting the seat of a regulating device for the flow of hot water, the movable portion 51 of which is connected to the thermostatic bulb 43. This movable portion 51 has the shape of a cylinder connected by radial arms to a central part fast with the bulb 43. This cylinder slides without play in a portion 54 of the body 39 in which the rear end of the sleeve 44 is screwed, comprising radial holes 55 and axial holes 56.

The thermostatic bulb 43 as well as the movable obturator 51 are urged by a spring 53 tending to maintain the rod 43a in contact with the pusher 45.

In the described mixer tap, the cold water enters through the opening 2 in the chamber 7, passes through the passages 20 and the milled groove 19, then, in the position shown in the drawings, traverses the plates 23, 24 through their openings 27, 29, which are aligned, enters the channel 37, arrives in the chamber 38, traverses the portion 54 of the body 39 by the axial passages 56, turns around the movable element 51 and is mixed within the sleeve 44 with hot water coming from the opening 3 of the chamber 40 and traversing the radial passages 55 of the portion 54 of the body 39.

It is to be noted that the quantity of hot water coming into the sleeve 44 is determined by the position of the movable part 51 which modifies the cross section of the holes of the part 54, thus modifying the proportion of hot water and thus the temperature of the mixture. This desired temperature of the mixture is adjusted by the position of the regulating member 48, 49 which is determined by the user.

The mixed water passes through the thermostatic bulb 43 which detects any variation of temperature and causes a displacement of the movable obturator 51 in order to maintain the temperature of the mixture at the desired value. The mixed water passes then through the central channel 32, traverses the central opening 31 of the fixed plate, passes in the recess 28 of the movable plate and comes back through opening 30 in the fixed plate and through the channel 34 from which it is delivered to the chamber 35 and finaly to the outlet opening 4.

To regulate the flow it suffices to turn the control member 12, 13, modifying the angular position of the ceramic plates 23, 24 from a position of full flow as shown, in which the openings 27 and 29 are totaly aligned up to a closure position in which the openings 29 and 30 of the fixed plate 24 are in front of planar portions of the movable plate 23 thus closing on the one hand the inlet of cold water and avoiding any internal circulation between the cold and hot water, and on the other hand the mixture of water just before the outlet of the mixer tap.

The described mixer tap has numerous advantages, of which the main ones are the following:

a. Only one pair of ceramic plates 23, 24 enables regulating the flow of cold water simultaneously with the flow of the mixed water and, in closure position avoids any internal circulation between the hot water and the cold water.

b. These plates are displaced only in rotation the one with respect to the other.

c. These plates cause simultaneously the regulation as well as the obturation of the water mixture and of the inlet of hot or cold water.

d. The flow of mixed water traverses the fixed plate twice through different openings and along two opposed directions.

e. The movable plate 23 is traversed by the entering flow of one of the streams of water and causes a deflection of 180° of the flow of mixed water.

f. The driving in rotation of the movable plate is effected by a shaft.

g. The control of the temperature and of the flow are located each at one end of the mixer tap.

h. The plates are located downstream of the flow of mixed water with respect to the thermostatic bulb.

In a variant, it is evident that the inlet openings of the cold water 2 and of the hot water 3 may be reversed, the flow of hot water being regulated by the ceramic plates 23, 24.

In a variant, the movable plate 23 could comprise one aperture replacing the two recesses 22, this aperture being however obturated by the frontal face of the disc 17 of the part 16. A joint can be provided between this part 16 and the plate around this aperture.

Figure 6:
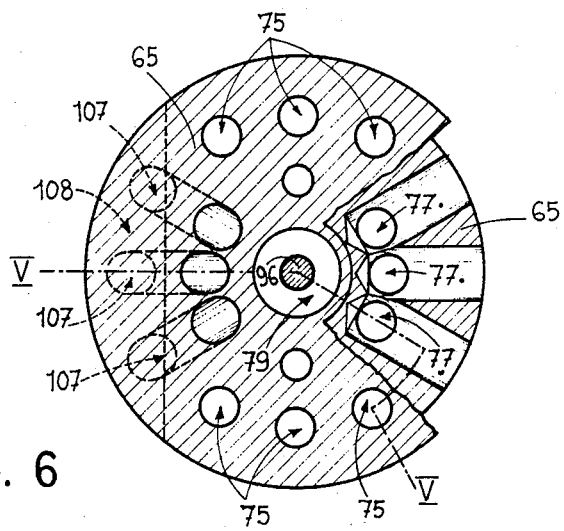
FIG. 6 is a transverse cross section of the mixer tap on line VI—VI of FIG. 5.
Figure 7:
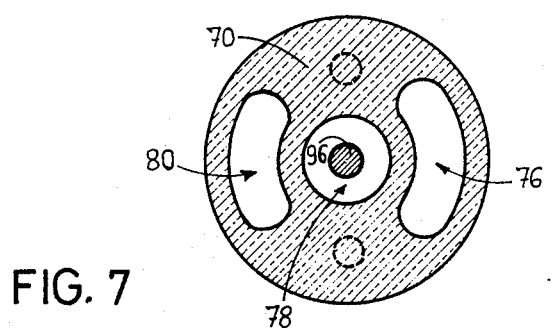
FIGS. 7 and 8 show in plan view the fixed and movable ceramic plates of the mixer tap.
Figure 8:
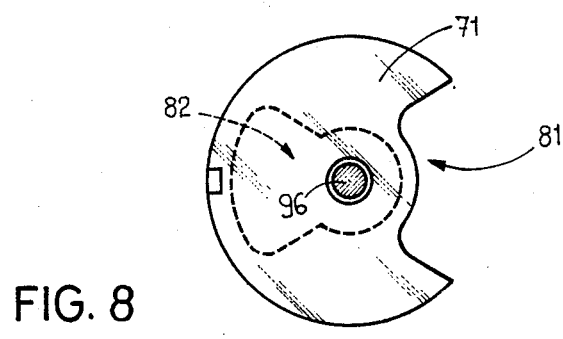

The second embodiment of the mixer tap shown in FIGS. 5 to 8 comprises a tubular body closed at one of its end and presenting at its other end a manual control member permitting simultaneously regulating the flow of water as well as the desired temperature of the water mixture.

The tubular body 60 comprises, as in the first embodiment, an inlet opening 61 for the cold water, an inlet opening 62 for the hot water and an outlet opening 63 for the water mixture.

Within the tubular body 60, a mechanism is mounted which is fixed to this body 60 by a screwed ring 64, comprising a device for the control of the flow of water as well as a device for the regulation of the temperature of the water mixture. As will be seen latter on, these two devices are actuated by means of only one manual actuating member, the mixer tap is thus of the mono control type.

The control device of the flow of water, located in the upper part which is open of the body 60, comprises a body 65, having a general cylindrical shape, the peripheral surface of which presents a diameter corresponding to the internal diamer of the tubular body 60. A groove 66 defines an annular chamber, sealed by means of ring joints 67, 68 which communicate with the inlet opening 61 for cold water.

The upper end, located on the open side of the body 60, of the body 65 has a cylindrical housing 69 within which a fixed ceramic plate 70 is housed as well as a ceramic plate 71 which is movable in rotation as well as the member 72 for driving in rotation this movable plate 71. A ring joint 73 ensures the seal between the driving member 72 and the body 65.

The ceramic plates 70, 71 which are concentric to the housing 69, have a diameter which is less than the inside diameter of the driving member 72 providing thus a chamber 74. This chamber 74 communicates with holes 75 longitudinally traversing the body 65.

The plate 70 (FIG. 7) comprises a first aperture 76, communicating with the inlet opening 61 of cold water through the intermediary of three bend ducts 77 ending in the groove 66.

This plate 70 presents a second central aperture 78 communicating permanently with a central chamber 79 provided in the body 65 and receiving, as will be seen latter on, the thermostatic bulb of the device for the regulation of the temperature.

Finally, this plate 70 comprises further a third aperture 80 presenting, as the aperture 76, the shape of a slot making an arc or circle, connected through channels 107 ending in a housing 108 to the outlet opening 63 for the mixture of water. This plate 70 is angularly and axially fixed with respect to the body 65.

The movable plate 71 (FIG. 8) comprises a peripheral through recess 81 which in maximal opening position for the flow is superimposed on the opening 76 of the fixed plate 70. A recess 82 enables connecting in fully or partially opened position the central opening 78 to the third opening 80 of the fixed plate. According to the relative angular position of the plates 70 and 71 the output passages between the apertures 76, 78 and 80, 82 vary.

The portion of the actuating member 72 emerging from the body 65 comprises a notch in which a control lever 83 is pivoted around an axis 84. An angular displacement of the control lever around the longitudinal axis X—X of the mixer tap causes a relative rotation of the plates 70, 71 and a modification of the water flow.

The lower part of the bottom of the cylindrical body 60 is occupied by the regulating device for the temperature of the water mixture comprising a body 85, the diameter of which corresponds to the internal diameter of the body 65 and comprising an annular groove 86 connected with the inlet opening 62 of the hot water. Joints 87, 88 ensure the sealing of the entrance of the hot water. This body 85 comprises a central void presenting portions 89, 90 of different diameters so as to create a shoulder 91. The part of this void of greater diameter 90 is connected to the groove 86 by radial holes 92.

The frontal portion of the body 85 is screwed on the rear part of the body 65, so that the whole mechanism located in the body 60 is monolithic. An annular chamber 109 is provided between the two bodies 65 and 85. This chamber communicates on the one hand with the holes 75 and on the other hand through the intermediary of slots 94 provided in the body 85 with the central void 79 of the body 65.

The thermostatic bulb 95 is housed in the central void 79 of the body 65 and its upper end is provided with a control rod 96 traversing the plates 70, 71 as well as the driving member 72 in a sealed manner. The other end of the bulb 95 carries an annular distributor 97. When the distributor 97 comes to rest against the face 91, a supplemental safety stroke is to be provided in order to avoid any deterioration of the bulb.

This stroke is then obtained by compression of an overstroke spring 98a of very low force so that it does not modify much the force of the return spring 98.

The hot water penetrates into the chamber 109 by the cross section which is regulated by the thermostatic bulb 95 located between the shoulder 91 and the rear edge of the annular distributor 97 and is mixed with the cold water. The water mixture traverses the body 65 through its central void 79, then traverses the central opening 78 of the fixed plate 70 and is returned by the recess 82 of the movable plate 71 into the channel 107, the recess 108 and the outlet opening 63 for the mixed water.

As in the first embodiment only one pair of ceramic plates enables regulating the flow of one of the streams of inlet water, here the cold water, and the mixed water.

In this embodiment having a monocontrol, the actuating lever controls as seen above, the relative angular positions of the plates 70, 71 through a rotation around the axis X—X to regulate the flow of water. A tilting of this lever 83 around its hingeing axis 84 acts through a mechanisme which is described hereunder on the end of the rod 96, the position of which determines by the intermediary of the thermostatic bulb 95 the desired temperature of the mixture of water. p This mechanism comprises a slide 99 displacable in the slot 100 of the driving member 72 guided by ribs located in oblique grooves 101. This slide 99 comprises a housing 102, in which a spherical stud 103 of the control lever 83 is located.

The lower face of this slide 99 has a groove having the shape of a dovetail in which a rib 104 is engaged, having a corresponding shape of a wedge 105, the lower face of which is in contact with the control rod 96 is inclined in the opposed direction from the oblique grooves 101. In this manner, the amplitude of the displacement along the axis X—X of the rod 96 is doubled for a given lateral displacement of the slide 99.

To enable a correct setting of the thermostatic bulb 95, the position of the wedge 105 on the slide is adjustable by means of a screw 106 fixed to the said slide.

In a variant, it is evident that one could provide for a control mechanism having only one lever, the angular displacement of which around the axis X—X of the mixer tap would control the temperature of the mixture whereas the tiltings of this lever around the axis 84 would control the flow of water delivered.

This second embodiment of the mixer tap has the same advantages a to e and h as the first embodiment. Furthermore, the mechanism for regulating the flow rate, and particularly the plates 70, 71 are easily accessible and may be replaced without dismounting the body 60 of the installation in which the mixer tap is mounted.

In this embodiment, it is further to be noted that the control mechanism having only one lever which is of a very simple realization, enables an easy calibration of the temperature of the water mixture.

Also, it is particularly interesting to note that during an overstroke of the control rod 96 of the thermostatic bulb 95, the maximum internal pressure within the bulb is limited by the force of the overstroke spring 98, but the resting force of the distributer 97 on the shoulder 91 remains low and is determined by the force of the bearing spring 98a. This bearing force is totally independent from the overstroke spring 98.

I claim:

1. Mixer tap comprising within a body presenting cold and hot water inlet openings and an outlet opening for the mixed water, a device for regulating the flow rate of at least one of the inlet water and of the mixture of water, as well as a regulating device of the temperature, characterized by the fact that the device for regulating the flow rate comprises an obturator with only one pair of ceramic plates displaceable in rotation the one with respect to the other, the ceramic plates controlling the flow rate of and contacting simultaneously only one stream of inlet water and the outgoing mixture of water.

2. Mixer tap according to claim 1, characterized by the fact that one of the ceramic plates is fixed and comprises a central aperture for the flow of said mixture and two lateral apertures disposed symmetrically on either side of the central aperture for the flow of said mixture and of said one stream respectively.

3. Mixer tap according to claim 2, characterized by the fact that the other ceramic plate is movable and comprises on the one hand a lateral opening cooperating with one of the apertures of the fixed plate and on the other hand a recess cooperating with the two other apertures of the fixed plate.

4. Mixer tap according to claim 1, characterized by the fact that the two ceramic plates are traversed by the flow of said one stream whereas only one of the plates is traversed by the flow of mixed water.

5. Mixer tap according to claim 3, characterized by the fact that the flow of mixed water goes through the central aperture of the fixed plate in one direction and is deflected 180° in the recess of the movable plate and traverses again the fixed plate in the other direction through one of its lateral openings.

6. Mixer tap according to claim 1, characterized by the fact that the body is tubular and that the device for regulating the flow rate and the device for regulating the temperature are mounted in a removable manner in this body.

7. Mixer tap according to claim 2, characterized by the fact that the other ceramic plate is movable and comprises on the one hand a lateral aperture cooperating with one of the apertures of the fixed plate and on the other hand a second opening cooperating with the two other openings of the fixed plate, this latter opening being obturated on the opposite side of the fixed plate.

8. Mixer tap according to claim 1 characterized by the fact that the body is tubular, and that, actuating members of the regulating device for the flow rate and for the regulating of the temperature are located each at one end of the tubular body.

9. Mixer tap according to claim 1, characterized by the fact that it comprises a monocontrol, an actuating member of which is displaceable in rotation and tiltable and controls the regulating device of the flow rate and of the temperature regulation, the body being tubular, and this mono-control being located at one end of the tubular body.

10. Mixer tap according to claim 9, characterized by the fact that a control rod of a thermostatic bulb of the device for regulating the temperature of the mixed water traverses throughout the two ceramic plates of the regulating device for the flow rate of the water.

11. Mixer tap according to claim 10, characterized by the fact that an annular distributer an edge of which cooperates with a shoulder of the tubular body for defining a passage cross section of one stream of inlet water is connected to the thermostatic bulb through the intermediary of a bearing spring which determines alone the pressure of this edge against the said shoulder in case of overstroke of the control of the thermostatic bulb.

12. Mixer tap according to claim 9, characterized by the fact that one of the plates is movable, sand the movable plate is driven in rotation through a driving member a portion of which emerges from the body and has a slot in which a sliding block moves within slanted slides.

13. Mixer tap according to claim 12, characterized by the fact that the sliding block comprises a housing in which is located a stud of a control lever, hinged on the driving member around an axis perpendicular to the longitudinal axis of the mixer tap, an opposite resting face of the sliding block comprising a wedge having an active face which, in contact with a control rod of a thermostatic bulb is inclined in the opposite direction to the slide for the sliding block.

14. Mixer tap according to claim 13, characterized by the fact that the position of the wedge with respect to the sliding block is adjustable by means of a screw.

* * * * *